Feb. 28, 1956    J. R. H. DUTILH    2,736,851
ELECTROMECHANICAL PHASE-SHIFTERS
Filed May 13, 1952
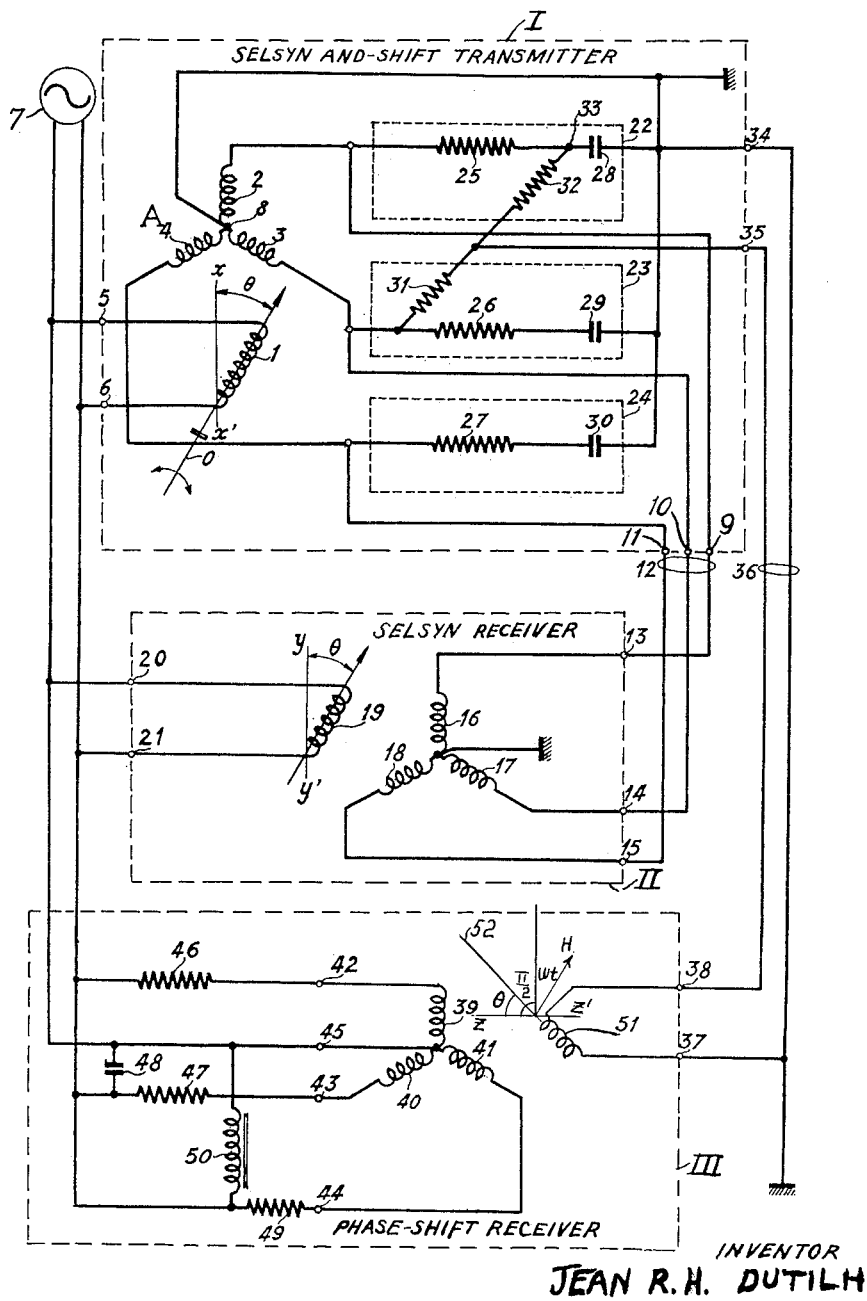
INVENTOR
JEAN R. H. DUTILH
By Wenderoth, Lind & Ponack
ATTORNEYS

United States Patent Office 2,736,851
Patented Feb. 28, 1956

2,736,851

ELECTROMECHANICAL PHASE-SHIFTERS

Jean R. H. Dutilh, Paris, France

Application May 13, 1952, Serial No. 287,495

Claims priority, application France August 14, 1947

1 Claim. (Cl. 318—19)

This invention relates to angular position data transmission devices.

Said devices are generally of two kinds, namely synchros or selsyns and electromechanical phase-shifters. Synchro generators have one rotor coil fed by a single phase alternating current and generally three stator coils in which are induced three cophasal output voltages having magnitudes dependent upon the angular setting of the rotor coil, and they are connected to synchro motors through three wires, if not including the A. C. power line. Angular data phase-shift transmitters are devices which are fed by a single phase reference alternating current and give a single phase output voltage, phase-shifted with respect to said reference voltage by a phase shift depending upon the angular data to be transmitted, and they are connected to phase shift receivers through two wires, if still not including the A. C. power line. Such phase shift transmitters and receivers generally comprise stator field coils generating a rotating magnetic field and a rotor coil placed in said field (see Radio Engineers' Handbook, F. E. Terman, McGraw-Hill Book Company, 1943, page 949, Fig. 56c). When the rotor coil is placed stationary in the rotating field, it picks-up a voltage the phase of which depends upon the position of the coil, and when it is fed by a current of the same frequency than the rotating field, it places itself at a position which depends upon the phase of the feed current.

It is an object of the invention to provide an angular position data transmission device which starting from a primary alternating single-phase voltage shall permit the simultaneous transmission of three cophasal output components having amplitudes dependent upon the angular setting of the rotor coil and of one output voltage the phase of which is shifted with respect to that of the primary voltage by the same angular setting.

It is a further object of the invention to provide a "combining" selsyn, which permits simultaneously the transmission of the angular indication of this selsyn's rotating shaft to another receiving selsyn through a three wire line and also the same indication to a phase shift receiver through a two wire line, the angular setting of the shafts of the combining selsyn, of the receiving selsyn and of the phase shift receiver being the same.

It is a further object of the invention to associate, with a selsyn transmitter, phase-shifting networks which are identical at the three stator coils and to obtain thereby a voltage, the phase of which is shifted by the same angle as the selsyn rotor angular setting, at a suitable tap point of a potentiometer connected between two said phase shifting networks.

Assuming the primary voltage to be $U_0 = E \cos \omega t$ and the single-phase winding of a three-phase selsyn transmitter be fed with this voltage, then at any given instant, the rotating single-phase winding of the selsyn makes an angle $\theta$ with respect to a suitably chosen origin.

It is known that three-phase amplitude voltages will be collected at the terminals of the induced three-phase windings of the selsyn stator, and namely under the form of:

$$(1) \quad \begin{cases} E_1 = E \cos \theta \cos \omega t \\ E_2 = E \cos \left(\theta - \dfrac{2\pi}{3}\right) \cos \omega t \\ E_3 = E \cos \left(\theta - \dfrac{4\pi}{3}\right) \cos \omega t \end{cases}$$

According to the invention, these various voltages which have three-phased amplitudes, but which are cophasal with reference to time, are, on one hand, transmitted to selsyn receivers and, on the other hand, phase-shifted in time by an angle equal to that by which their amplitudes in space are shifted, which means that the voltage $E_1$ will be phase-shifted by a zero angle and remains unchanged, that the voltage $$E_2 = E \cos \left(\theta - \dfrac{2\pi}{3}\right) \cos \omega t$$

will be phase-shifted by $$\dfrac{2\pi}{3}$$

so as to obtain:

$$E'_2 = E \cos \left(\theta - \dfrac{2\pi}{3}\right) \cos \left(\omega t - \dfrac{2\pi}{3}\right)$$

and that the voltage $$E_3 = E \cos \left(\theta - \dfrac{4\pi}{3}\right) \cos \omega t$$

will be phase-shifted by $$\dfrac{4\pi}{3}$$

so as to obtain:

$$E'_3 = E \cos \left(\theta - \dfrac{4\pi}{3}\right) \cos \left(\omega t - \dfrac{4\pi}{3}\right)$$

The voltages $E_1$, $E'_2$, $E'_3$ thus shifted are respectively multiplied by attenuation factors $k_1$, $k_2$, $k_3$ and added, that is to say the sum:

$$U = k_1 E_1 + k_2 E'_2 + k_3 E'_3$$

is obtained.

The attenuation factors $k_1$, $k_2$, $k_3$ are chosen in such a manner as to obtain:

$$U = KE \cos (\omega t + \theta + \alpha_0) \qquad (2)$$

wherein $K$ and $\alpha_0$ are constant values. The phase of this latter voltage with respect to the primary voltage $U_0$ is equal, except for the constant value $\alpha_0$, to the angular setting $\theta$ of the selsyn's rotor.

If $k_1 = k_2 = k_3 = 1$, $$U = E_1 + E'_2 + E'_3 =$$

$$E \left[ \cos \theta \omega t + \cos \left(\theta - \dfrac{2\pi}{3}\right) \cos \left(\omega t - \dfrac{2\pi}{3}\right) + \cos \left(\theta - \dfrac{4\pi}{3}\right) \cos \left(\omega t - \dfrac{4\pi}{3}\right) \right] = \dfrac{3}{2} E \cos (\omega t - \theta)$$

The voltage $U$ is transmitted through a two wire line to a phase-shift receiver having a rotative shaft which shaft reproduces the angular setting of the selsyn rotor shaft.

The exact nature of the invention may further be understood from the following detailed description taken in conjunction with the attached drawing in which the single figure represents the selsyn phase-shifting device in accordance with the invention and which is simultaneously cooperating with a selsyn receiver and with a phase shift receiver.

In the drawing, I denotes the new angular position data transmission device according to the invention, II a conventional selsyn receiver and III a conventional phase shift receiver, A represents a three-phase selsyn transmitter having rotor winding 1 and three stator windings 2, 3, 4 connected in a star arrangement. Rotor winding terminals 5 and 6 are fed with monophase alternating current $U_0$ from source 7 and rotor 1 is fixed on shaft O to form the angle $\theta$ with respect to the fixed mark $xx'$. The neutral point 8 of the stator windings is connected to ground. Thus the voltage between terminals 9, 10 and 11 respectively of windings 2, 3 and 4 and the ground are given by Equations 1 herein above.

These voltages are transmitted in conventional manner along the three wire line 12 to the terminals 13, 14 and 15 of the stator windings of the receiving selsyn II. The receiving selsyn comprises three stator windings 16, 17 and 18 in star connection and a rotor winding 19, the latter being fed from alternating current source 7 through the terminals 20 and 21. Thus, the angle $\theta$ which rotor 19 forms with reference line $yy'$ is equal to that angle which rotor 1 makes with line $xx'$.

The terminals 9, 10 and 11 of the selsyn are also the input terminals of the three-phase shifting networks 22, 23 and 24, which latter comprise respectively, resistors 25, 26 and 27, and capacitors 28, 29 and 30. The three resistors 25, 26 and 27 have the same value R and in like manner the three capacitors 28, 29 and 30 are identical to each other; the value R of a resistor is $\sqrt{3}$ times greater than the absolute value of the impedance $-jX$ of a capacitor for the angular frequency $\omega$:

$$R = \sqrt{3}X$$

Moreover, R has a large value as compared with the impedance of the selsyn coils.

31 and 32 are two resistances connected together. The first one has $2R_0$ for its value and its outer end is connected to the terminal 10 of the selsyn. The second one has $R_0$ for its value and its outer end is connected to junction point 33 of resistance 25 and capacitor 28.

$R_0$ is much higher than R.

It is apparent that the resistance of the shunt 31—32 may be neglected since $R_0$ is much higher than R with respect to the common impedance of the networks 22, 23, 24, and therefore the terminal 34 to which are connected the outputs of the three networks 22, 23 and 24 will be at ground voltage. As a matter of fact, it forms an artificial neutral point of a balanced composite network.

The output of this composite network is taken between neutral point 34 and junction point 35 of resistors 31 and 32.

If $E_g$ designates the voltage at the point 33 $E_2$ being the voltage at terminal 10, the output voltage U between terminals 34 and 35 will be given by the formula:

$$U = E_g + \frac{E_2 - E_g}{3} = \frac{1}{3}(2E_g + E_2) \quad (3)$$

since the voltage drop in resistor 32 is the third portion of the voltage drop in both resistors 31 and 32.

The voltage drop $E_1$ between terminals 9 and 34 divides into a voltage drop through resistor 25 equal to $$E_1 \frac{\sqrt{3}}{\sqrt{3}-j}$$

and a voltage drop through capacitor 28 equal to $$E_1 \frac{-j}{\sqrt{3}-j}$$

since the resistance of 25 is $\sqrt{3}$ times greater than the impedance of 28.

Consequently:

$$E_g = \frac{-j}{\sqrt{3}-j} E_1$$

Replacing $E_g$ by its value in Equation 3, we have:

$$U = \frac{1}{3}\left(\frac{-2j}{\sqrt{3}-j}E_1 + E_2\right) \quad (4)$$

and replacing $E_1$ and $E_2$ by their values from Equations 1 in Equation 4, we have:

$$U = \frac{E}{3}\left[\left(\frac{1}{2}-j\frac{\sqrt{3}}{2}\right)\cos\theta + \cos\left(\theta - \frac{2\pi}{3}\right)\right]\cos\omega t$$

whence an elementary calculation gives:

$$U = \frac{E}{2\sqrt{3}}(\sin\theta - j\cos\theta)\cos\omega t$$

$$U = \frac{-E}{2\sqrt{3}}e^{j\left(\theta+\frac{\pi}{2}\right)}\cos\omega t$$

$$U = \frac{E}{2\sqrt{3}}\cos\left(\omega t - \theta + \frac{\pi}{2}\right)$$

which voltage appears according to Equation 2 since the angle of phase-shift of this voltage is equal, but for a constant $$\frac{\pi}{2}$$

to the angle $\theta$ by which the rotor's shaft has turned. The constant K of Equation 2 is equal to $$\frac{1}{2\sqrt{3}}$$

The voltage U, which is available at terminals 34 and 35 is applied through the two conductor line 36, to terminals 37 and 38 of rotor winding 51 in the phase shift receiver. Stator winding 39 of said phase shift receiver is fed through terminals 42—45 across resistance 46, by a current which is cophasal with the feeding voltage of source 7. The stator winding 40 is fed through terminals 43—45 across the network comprising resistor 47 and capacitor 48, by a current which is 120° in advance of the voltage from source 7. Finally, the stator winding 41 is fed through its terminals 44—45 across the network comprising resistor and inductance 50, by a current which is 120° behind the voltage of source 7. Windings 39, 40 and 41 produce a rotating field H which makes an angle $\omega t$ with the axis of winding 39 and an angle $$\omega t + \frac{\pi}{2}$$

with a line $zz'$ perpendicular to said axis. By assuming that the current in winding 51 is substantially cophasal with the voltage U, the action of the field H on the winding 51 is proportional, with the exception of a constant factor to the product of the sine of the angle between the field and the axis 52 of winding 51 by the current in said winding, i. e. to:

$$\sin\left(\omega t - \theta + \frac{\pi}{2}\right)\cos\left(\omega t - \theta + \frac{\pi}{2}\right)$$

The average value of said product during a period $$\frac{2\pi}{\omega}$$

is zero and rotor 51 positions itself within the rotating field to make an angle $\theta$ with $zz'$.

Although the invention has already been described from the case of a three-phase selsyn, the adjoining network to the selsyn for forming the phase shifting device is general. Where the selsyn has $n$ angular equidistant stator windings, each dephasing network comprising a resistor such as 25 and a capacitor such as 28, should furnish a phase shift equal to $$\frac{2\pi}{n}$$

and the tap-point 35 will be located at the fraction $$\frac{p}{1-p} = \cos\frac{2\pi}{n}$$

of a potentiometer connected between points 10 and 33 or, in an equivalent manner a resistor 31 having a value of $(1-p)R_0$ and a resistor 32 having a value of $pR_0$ wherein $p$ is defined by the relationship above will be connected in the manner shown by Fig. 1.

The present application is a continuation-in-part of application Serial No. 42,072, filed August 2, 1948, which has become abandoned.

What is claimed is:

An angular position data transmission device comprising, a multiple component output energy transfer device having a single phase input voltage circuit and four output component connections one of which being a neutral point, said device comprising inductive means having a rotor winding coupled to said input voltage circuit and a three-phase star-connected stator coupled to said output component connections and being so arranged that relative movement between the first and the second part produces relative variations of the alternating voltage component amplitudes between each output terminal coupled to one stator winding and the neutral terminal, three coupling networks constituted each by a capacitor having an impedance $jX$ in series with a resistor having a value of $X\sqrt{3}$, these resistors being connected with the corresponding output terminals of said energy transfer device, and the capacitors being connected together to the neutral point, a high resistor connected with the point coupling the resistor and the capacitor in one phase, another high resistor which is double that of the former resistor connected with the output feeding the resistor of another phase, the output terminals of the device being the neutral point and the junction point of said high resistors wherefrom a voltage phase shifted with respect to the input voltage by the same angle as the angular rotor setting is collected.

References Cited in the file of this patent

UNITED STATES PATENTS

| | | |
|---|---|---|
| 1,900,538 | Bedford | Mar. 7, 1933 |
| 2,078,667 | Kado | Apr. 27, 1937 |
| 2,356,186 | Somers | Aug. 22, 1944 |